United States Patent
Bordoz

(10) Patent No.: US 10,752,059 B2
(45) Date of Patent: *Aug. 25, 2020

(54) TIRE WITH GREATER RESISTANCE TO UNSEATING

(71) Applicant: COMPAGNIE GENERALE DES ETABLISSEMENTS MICHELIN, Clermont-Ferrand (FR)

(72) Inventor: Francis Bordoz, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 334 days.

This patent is subject to a terminal disclaimer.

(21) Appl. No.: 15/575,494

(22) PCT Filed: May 19, 2016

(86) PCT No.: PCT/EP2016/061193
§ 371 (c)(1),
(2) Date: Nov. 20, 2017

(87) PCT Pub. No.: WO2016/184937
PCT Pub. Date: Nov. 24, 2016

(65) Prior Publication Data
US 2018/0162179 A1 Jun. 14, 2018

(30) Foreign Application Priority Data
May 21, 2015 (FR) .................. 15 54540

(51) Int. Cl.
*B60C 15/05* (2006.01)
*B60C 15/02* (2006.01)
(Continued)

(52) U.S. Cl.
CPC .......... *B60C 15/05* (2013.01); *B60C 15/0009* (2013.01); *B60C 15/0018* (2013.01);
(Continued)

(58) Field of Classification Search
CPC . B60C 15/0018; B60C 15/05; B60C 15/0009; B60C 15/00; B60C 15/02; B60C 15/024; B60C 15/0607; B60C 15/0632
(Continued)

(56) References Cited

U.S. PATENT DOCUMENTS 3,662,597 A 5/1972 Deghetto
4,700,765 A 10/1987 Masclaux
(Continued)

FOREIGN PATENT DOCUMENTS

| EP | 103346 | 3/1984 |
|----|--------|--------|
| EP | 0 168 754 | 1/1986 |

(Continued)

*Primary Examiner* — Adrienne C. Johnstone
(74) *Attorney, Agent, or Firm* — Cozen O'Connor

(57) ABSTRACT

A tire comprises at least one bead having an axial width at the seat D comprises at least one main circumferential reinforcing element of which the radially innermost point is at a radial distance Z and at an axial distance Y from the radially innermost point of the bead, and such that Y/D is at least equal to 0.5 and Z/D is at most equal to 0.4. This same bead comprises at least one bead layer surrounding the bead filler rubber such that its axially outermost end is radially on the outside of the end of the carcass layer and it also comprises at least one additional circumferential reinforcing element, radially on the inside of the radially outermost point of the main circumferential reinforcing element.

20 Claims, 8 Drawing Sheets

(51) Int. Cl.
 *B60C 15/00* (2006.01)
 *B60C 15/06* (2006.01)
(52) U.S. Cl.
 CPC .......... *B60C 15/02* (2013.01); *B60C 15/0607* (2013.01); *B60C 15/0632* (2013.01)
(58) Field of Classification Search
 USPC .................... 152/550, 551, 545, 542, 552
 See application file for complete search history.

(56) References Cited

U.S. PATENT DOCUMENTS

| | | |
|---|---|---|
| 6,463,975 B1 | 10/2002 | Auxerre |
| 2013/0233460 A1 | 9/2013 | Schaffhauser et al. |
| 2017/0297382 A1* | 10/2017 | Bordoz ............... B60C 15/0018 |

FOREIGN PATENT DOCUMENTS

| | | |
|---|---|---|
| EP | 358490 | 3/1990 |
| EP | 1307351 B1 | 3/2006 |
| FR | 2 773 518 | 7/1999 |
| WO | WO 2011/104074 | 9/2011 |

* cited by examiner

TIRE WITH GREATER RESISTANCE TO UNSEATING

RELATED APPLICATIONS

This is a U.S. National Phase Application under 35 USC 371 of International Application PCT/EP2016/061193 filed on May 19, 2016. This application claims the priority of French application no. 1554540 filed May 21, 2015.

FIELD OF THE INVENTION

The present invention relates to tires for any type of vehicle, more particularly low-pressure tires. What is meant by low pressure is, for example and nonexhaustively, a pressure of the order of 1.5 bar in the case of a passenger-vehicle tire, of 1.2 bar for a sporty passenger-vehicle tire and of 0.6 bar for an agricultural vehicle. This low pressure may be the result of a loss of sealing or the result of a deliberate choice made in order to obtain a particular performance, such as, for example, grip in the case of a sporty passenger vehicle.

A tire comprises a crown comprising a tread intended to come into contact with the ground via a tread surface, two beads intended to come into contact with a rim and two sidewalls connecting the crown to the beads.

BACKGROUND

The ease with which a tire becomes unseated, which means to say with which the bead of the tire moves around on, and then comes off the rim, which means to say becomes detached from the rim when a transverse load is applied to the tire, is one of the tire features important to the safety of the passengers of the vehicle.

Unseating is more particularly a problem for the following low-pressure tires:
  tires for sporty vehicles where there is a desire to improve grip by having a contact patch that is increased by reducing the service pressure,
  tires for agricultural vehicles where there is a desire to reduce the impact on the compaction of cultivated land by reducing the service pressure,
  passenger-vehicle tires which are designed to run for a few hundred kilometres following a loss of pressure.

For example, for passenger-vehicles, the standardization authorities have, with respect to unseating and tires coming off the rim, set target values to be achieved (such as, for example, in Chinese standard GB/T 2978-2008) and corresponding test methods (such as, for example, the method recommended in Chinese standard GB/T 4502-2009). An example of a test method is also described in patent U.S. Pat. No. 3,662,597, whereby a conical form is applied against a sidewall of the tire. The pressure applied to the sidewall is then increased and the sidewall movement is recorded. A similar test method has been adopted in "Federal Motor Vehicle Safety Standard No. 109" by the American federal road safety organisation the NHTSA (National Highway Traffic Safety Administration).

These increasingly demanding recommendations from the standardization authorities require these tires to be made even more resistant to unseating and to coming off their rims.

Conventionally, the resistance to unseating can be increased by bonding the tire to the mounting rim, although this solution has the disadvantage of making the tire very difficult to remove. It is also possible to modify the geometry of the tire and of the rim, as disclosed in documents EP103346 B1 or EP1307351 B1 or EP358490 A2, so as to make unseating more difficult, but this approach entails destandardizing the rim and sometimes expensive modifications to the moulds used to manufacture the tires.

Since a tire has a geometry exhibiting symmetry of revolution with respect to an axis of rotation, the geometry of the tire was generally described in a meridian plane containing the axis of rotation of the tire. For a given meridian plane, the radial, axial and circumferential directions respectively denote the directions perpendicular to the axis of rotation of the tire, parallel to the axis of rotation of the tire and perpendicular to the meridian plane.

In what follows, the expressions "radially on the inside of" and "radially on the outside of" respectively mean "closer to the axis of rotation of the tire, in the radial direction, than" and "further from the axis of rotation of the tire, in the radial direction, than". The expressions "axially on the inside of" and "axially on the outside of" respectively mean "closer to the equatorial plane, in the axial direction, than" and "further away from the equatorial plane, in the axial direction, than". A "radial distance" is a distance with respect to the axis of rotation of the tire and an "axial distance" is a distance with respect to the equatorial plane of the tire. A "radial thickness" is measured in the radial direction, and an "axial width" is measured in the axial direction.

The expression "rubber compound" denotes a composition of rubber containing at least an elastomer and a filler.

SUMMARY OF THE INVENTION

The chief objective of the present invention is therefore to increase the resistance to unseating of a tire without making it more difficult to fit and to remove and without requiring modifications to the mounting rims conventionally used.

This objective is achieved in accordance with one aspect of the invention directed to a tire intended to be mounted on a mounting rim, comprising:
  two beads, which are intended to come into contact with the mounting rim,
  each bead having a radially innermost point, an axial width at the seat D, and an external face made up of the surface of the tire in contact with the outside of the tire and belonging to the bead, and each bead comprising at least one bead filler made up of at least one rubber composition and of at least one circumferential reinforcing element referred to as the main circumferential reinforcing element,
  the meridian section of the main circumferential reinforcing element having a radially innermost point, a radially outermost point and an axially innermost point, the radially innermost point being positioned at a radial distance Z and at an axial distance Y from the radially innermost point of the bead,
  the axial width at the seat D being measured between the radially innermost point of the bead and the point of intersection between a first straight line tangential to the external axial projection of the radially innermost point of the main circumferential reinforcing element and a second straight line tangential to the internal radial projection of the axially outermost point of the main circumferential reinforcing element,
  a carcass reinforcement connecting the two beads and comprising at least one carcass layer extending in each bead radially towards the inside as far as a carcass layer end, for at least one bead, the carcass layer end being radially on the inside of the point of greatest axial width (SM) of the tire and axially on the outside of the axially innermost point of the main circumferential reinforcing element, for the said bead, the ratio Y/D between the axial distance Y from the radially innermost point of the main circumferential reinforcing element to the radially innermost point of the bead, and the axial width of the bead at the seat D, being at least equal to 0.5, for the said bead, the ratio Z/D between the radial distance Z from the radially innermost point of the main circumferential reinforcing element to the radially innermost point of the bead, and the axial width of the bead at the seat D, being at most equal to 0.4, the said bead comprising a bead reinforcement, made up of at least one bead layer, which surrounds the bead filler in such a way that the axially outermost end of the bead layer is radially on the outside of the radially innermost end of the carcass layer and such that the axially innermost end of the bead layer is at least radially on the outside of the radially innermost point of the circumferential reinforcing element, for the said bead, the points on the bead reinforcement which are positioned radially on the inside of the radially innermost point of the main circumferential reinforcing element being positioned, with respect to the external face of the bead, at a maximum distance that represents at most Z/2, half the radial distance Z between the radially innermost point of the bead and the radially innermost point of the main circumferential reinforcing element, the said bead comprising at least one additional circumferential reinforcing element, axially on the inside of the axially innermost point of the main circumferential reinforcing element, radially on the outside of a radially innermost part of the bead reinforcement and radially on the inside of the radially outermost point of the main circumferential reinforcing element.

For a tire with a set direction of mounting, one possible solution is to apply the invention to just one of the beads, the one positioned on the outboard side. This is because the bead situated on the inboard side is subjected either to an unseating load that is lighter because of the load transfers of the vehicle under cornering or is subjected to a load that opposes unseating.

In the bead according to the prior art, unseating occurs under a lateral load applied to the crown which pulls on the carcass layer passing under the circumferential reinforcing element, which becomes unseated from the rim. The main force opposing this load is substantially proportional to the internal pressure of the tire. In the case of tires that are not highly inflated, this force may prove insufficient depending on the transverse load applied and particularly in the case of sporty vehicles which run at the limit of transverse grip of the tires, or vehicles that are heavily laden, or over ground exhibiting obstacles, such as, for example, holes, kerbs, liable to be the cause of lateral impacts.

In order to increase the lateral force that opposes unseating, a person skilled in the art will design a tire, particularly in the case of tubeless tires, the smallest diameter of which is less than the diameter at the seat of the rim. That generates a force, referred to as a clamping force, well known to those skilled in the art, which also helps to make the tire mounting airtight. The greater the clamping force, the less subject the tire is to unseating, but the more difficult it is to fit.

In order to increase the lateral load that opposes unseating, a person skilled in the art can also arrange, on the inside of the radially innermost point of the radially innermost carcass layer, a wedge of rubbery material known as a bead toe. Using this solution, he increases the axial width D of the bead at the seat. This bead toe by friction on the rim and by contact with the hump of the rim opposes unseating. The point of contact between the bead toe and the rim becomes the pivot point about which the bead moves. With this geometry, unseating occurs when the circumferential reinforcing element passes axially beyond the pivot point after having compressed the materials situated between the bead toe and the circumferential reinforcing element.

The axial width of the bead at the seat D is the axial distance between the radially innermost point of the bead and the point of connection between the seat and the side of the bead. The point of connection between the seat and the side of the bead is the point of intersection of the two straight lines of the meridian plane, tangential to the external face of the tire; a first tangential straight line in the external axial projection of the radially innermost point of the main circumferential reinforcing element, the second tangential straight line in the interior radial projection of the axially outermost point of the main circumferential reinforcing element. The axial width of the bead at the seat D is usually measured on a meridian cross section of the tire, obtained by sectioning the tire along two meridian planes. By way of example, a meridian section of tire has a thickness in the circumferential direction of around 60 mm at the tread. The measurement is taken keeping the distance between the two beads identical to that of the tire mounted on its rim and lightly inflated. This method of measurement also applies to all the other distances involving points internal to the tire, such as the axial distance Y from the radially innermost point of the main circumferential reinforcing element to the radially innermost point of the bead, the radial distance Z from the radially innermost point of the main circumferential reinforcing element to the radially innermost point of the bead.

For a given inside diameter of the main circumferential reinforcing element, the greater the distance between the bead toe and the main circumferential reinforcing element, the greater the unseating load. According to an embodiment of the invention, positioning the radially innermost point of the main circumferential reinforcing element at a radial distance Z and at an axial distance Y away from the radially innermost point of the bead and such that Y/D is at least equal to 0.5 and Z/D is at most equal to 0.4, makes it possible to guarantee a minimal unseating load, this being with the proviso that the material situated between these two points is sufficiently rigid, this being ensured by the additional circumferential reinforcing element.

Another solution for increasing the compression rigidity of this said bead filler portion is to oppose the induced transverse deformation, which in the case of rubbery materials is great. The solution proposed in accordance with an embodiment of the invention is to surround all of this bead filler portion with at least one layer of textile reinforcers, which are parallel to one another and limit this deformation. This layer of textile reinforcers is referred to as a bead layer and the assembled collection of these layers is referred to as the bead reinforcement.

In order to best limit the induced transverse deformations, it is appropriate for the bead layer to be as far towards the outside of the bead as possible without, however, being in contact with the rim where friction phenomena occur that could damage the reinforcers and render them unable to perform the desired function.

Rubbers specially designed to withstand friction over a thickness up to Z/2, which is half the radial distance between the radially innermost point of the bead and the radially innermost point of the main circumferential reinforcing element, can be used to protect the bead layer from this wearing phenomenon. The thickness of these rubbers affording protection against wear needs to be minimized because these rubbers are more compressible than the bead filler compound and that correspondingly reduces the effectiveness of the invention. According to an embodiment of the invention, for the said bead which comprises an external face, the points on the bead reinforcement which are positioned radially on the inside of the radially innermost point of the main circumferential reinforcing element are, with respect to the external face of the bead, at a maximum distance at most equal to Z/2, half the radial distance Z between the radially innermost point of the bead and the radially innermost point of the main circumferential reinforcing element, so as to provide effective opposition against the unseating loads. What is meant by the external face of the bead is that surface of the tire that is in contact with the outside of the tire and belongs to the bead.

The connection between the bead and the sidewall is via a zone referred to as region of overlap of the bead layer and of the carcass layer and therefore such that the end of the axially outermost bead layer is radially on the outside of the end of the radially innermost carcass layer.

During unseating, in order to increase the force of contact of the bead on the rim that opposes the movement of the bead toe so as to prevent this from acting as a pivot, it is essential to have at least one additional circumferential reinforcing element in the bead. In order for the effectiveness of this to be maximized, it is appropriate for this additional circumferential reinforcing element to be positioned as close as possible to the bead toe and radially on the outside of the bead reinforcement. An additional circumferential reinforcing element increases the local radial stiffness of the bead.

An embodiment of the invention dissociates two of the roles of the circumferential reinforcing element:

the reacting of pressure load under normal circumstances, namely a pressure close to the nominal pressure as recommended, for example, by the Tire and Rim Association or TRA, which requires high stiffness and high strength. This role of keeping the pressurized tire on the rim is performed by the main circumferential reinforcing element.

the reacting of the force of movement of the bead toe by transverse forces during low-pressure use. This role entails an additional circumferential reinforcing element with a diameter close to the diameter of the rim. By contrast, this role cannot be fulfilled by a metal circumferential reinforcing element of high stiffness because the use of such an element would make the tire difficult to fit.

The dissociating of the two functions makes it possible, in order to perform this second function, to use materials of lesser stiffness for the additional circumferential reinforcing element. By way of indication, the additional circumferential reinforcing element has a radial stiffness at most equal to 0.75 times the radial stiffness of the main circumferential reinforcing element. This lower stiffness therefore allows an additional circumferential reinforcing element to be positioned at a smaller diameter than that of the metal main circumferential reinforcing element, capable of preventing unseating in the event of use at low pressure, while at the same time maintaining the ease of fitting of the tire.

The main circumferential reinforcing element may be produced either using metal reinforcing elements or using textile reinforcing elements wound in a spiral or braided together.

In one preferred embodiment, the radially innermost point of the main circumferential reinforcing element is at an axial distance Y from the radially innermost point of the bead such that the ratio (Y/D) of this said axial distance (Y) to the axial width of the bead at the seat (D) is at most equal to 0.75. This is because it is necessary not to place the main circumferential reinforcing element in contact with the bead layer in order not to cause wearing of their constituent parts through friction, and not to cause cracking of the rubber composition of the bead filler through shear as a result of an excessively small thickness of this material between the two reinforcing elements that are the bead layer and the main circumferential reinforcing element.

For these same reasons, in order to offset the risks of wearing of the reinforcing elements or of cracking of the bead filler at the seat, it is particularly advantageous for the radially innermost point of the main circumferential reinforcing element to be situated at a radial distance (Z) from the radially innermost point of the bead such that the ratio (Z/D) of this said radial distance (Z) to the axial width of the bead at the seat (D) to be at least equal to 0.25.

The connection between the bead and the sidewall is through the shearing of the materials, generally rubber materials, situated between the reinforcing elements of the bead layer and of the carcass layer, referred to as shear rubber. The thickness of these said shear rubbers and the length of the overlap determine the balance between lateral rigidity and durability of the tire. It is therefore advantageous for a tire operating at low pressure, for the axially outermost end (231) of the bead layer to be radially on the outside of the radially innermost end (311) of the carcass layer (31) and for it to have a difference in radius at least equal to 10 mm, preferably at least equal to 20 mm.

It is particularly advantageous for the end of the carcass layer that is radially innermost to be radially on the outside of the radially outermost point of the main circumferential reinforcing element.

In order to guarantee the geometry and particularly the position of the bead reinforcement with respect to the external face of the bead for the part radially on the inside of the radially innermost point of the main circumferential reinforcing element, it is necessary to eliminate movements of the bead filler which are caused by the forces applied to the carcass reinforcement while the tire is being moulded during manufacture. The proposed solution is to eliminate the presence of the carcass reinforcement in the bead and to secure the bead and the sidewall using a region referred to as a region of overlap between the carcass reinforcement and the bead reinforcement and preferably radially on the outside of the radially outermost point of the main circumferential reinforcing element.

In order to do this, the radially innermost end of the carcass reinforcement is situated radially on the outside of the greater radius of the main circumferential reinforcing element. In addition, in order for the carcass reinforcement to perform its function of connection with the crown, its end is situated radially on the inside of the point of widest axial cross section of the tire. The maximum axial width of the tire is measured at the sidewalls, with the tire mounted on its rim and lightly inflated, namely inflated to a pressure equal to 10% of the nominal pressure as recommended, for example, by the Tire and Rim Association or TRA.

According to an embodiment of the invention, the carcass layer in which the overlap occurs may be either axially on the inside or on the outside of the bead layer participating in the overlap. Therefore, one of the possible embodiments of the invention is such that the end of the axially outermost bead layer is axially on the outside of the end of the radially innermost carcass layer. Another embodiment is such that the end of the axially outermost bead layer is axially on the inside of the end of the radially innermost carcass layer.

Depending on the number of carcass layers in the carcass reinforcement and of bead layers in the bead reinforcement, it is possible either to restrict the solution to a single length of overlap between two layers of each of the reinforcements or to multiply the lengths of overlap by alternating a carcass layer and a bead layer or a bead layer, two carcass layers, a bead layer. It is possible to bring the bead layer all the way up to just below the crown. This solution makes it possible to increase the rigidity of the sidewalls of the tire in order to meet vehicle dynamic response criteria. However, to do that, the carcass layer or layers absolutely must be able to react all of the tension in the radial direction associated with the inflating of the tire. Those skilled in the art have, for this purpose, well known solutions, such as, for example, the geometry and modulus of the reinforcers that make up the carcass layer compared with those that make up the bead layer.

Advantageously, the reinforcing elements of a bead layer are made of textile, preferably of aliphatic polyamide, aromatic polyamide or a combination of aliphatic polyamide and of aromatic polyamide, of polyethylene terephthalate or of rayon, because they easily adapt to the various bead geometries.

It is also advantageous for the reinforcing elements of a carcass layer to be made of metal or of textile, preferably of aliphatic polyamide, aromatic polyamide or a combination of aliphatic polyamides and of aromatic polyamide, of polyethylene terephthalate or of rayon, depending on the service pressure of the tire. For tires with a service pressure of below 1.5 bar, carcass reinforcements with reinforcing elements made of textile are often preferred on account of their low weight and ease of use. For tires with a service pressure of above 1.5 bar but with an extended mode anticipating use with a pressure of below 1.5 bar, the carcass reinforcements with reinforcing elements made of metal are often preferred on account of their compression and fatigue strength.

According to one particular embodiment, the reinforcing elements of the carcass layer are parallel to one another and make with the circumferential direction an angle of between 65° and 115°, for well-known rolling-resistance and comfort performance.

Two reinforcing elements are said to be "parallel" in this document when the angle formed between the two elements is less than or equal to 5°.

According to one preferred embodiment, a bead layer comprises reinforcing elements that are parallel to one another and make with the circumferential direction an angle of between 20° and 160°, allowing an advantageous compromise between circumferential rigidity of the bead to limit wear upon contact with the mounting rim and flexural rigidity to limit deformation around the rim flange, which is a source of a great deal of energy dissipation given the significant volume of rubber present in the bead. Moreover, the choice of the angle of the bead layer depends on the rigidities that the tire designer wishes to obtain, notably in order to meet vehicle dynamic criteria. The radial position of the ends of the bead layers is also an advantageous parameter in setting the structural rigidities of the tire.

It is particularly advantageous for the at least one additional circumferential reinforcing element to comprise at least one textile material, preferably an aliphatic polyamide, an aromatic polyamide, a polyester or a rayon. Textile circumferential reinforcing elements are preferred in this function because their stiffness is somewhere between that of metal and that of rubber materials.

Specifically, the textile reinforcers have stiffnesses, estimated via their values of elastic modulus at 10% elongation in accordance with standard ASTM D 885, January 2010, comprised between 1 GPa and 130 GPa. These stiffnesses are of an order of at least 10 times higher than those of the rubber compounds as are usually employed in tires, which stiffnesses are estimated in terms of their so-called "nominal" secant elastic moduli at 10% elongation in accordance with standard NF ISO 37, December 2005, comprised between 1 MPa and 130 MPa. The benefit of an additional circumferential reinforcing element made of textile lies in the fact that its stiffness is lower in comparison with the metal generally used in tires, which stiffness is estimated in terms of the elastic modulus of the material measured during a tensile test in accordance with standard EN ISO 6892-1, and generally comprised between 150 and 230 GPa. The stiffnesses of the textile additional circumferential reinforcing elements allow ease of mounting and are high enough to ensure that the tire is held on the rim in the event of a drop in pressure, given the location at which the transverse forces are applied in an unseating situation.

The purpose of the at least one additional circumferential reinforcing element is to radially stiffen the bead portion containing it. It is therefore appropriate for it to be stiffer than the rubber material of the bead. The aforementioned materials meet the technical criteria listed hereinabove and are stiffer than the rubber materials usually employed in tires. Likewise, they are also less stiff than the metal such as steel usually employed for the main circumferential reinforcing element, so as to allow the tire to be fitted easily to the rim. Moreover, their deformation at break allows the tire to be fitted without damage.

Reinforcers of the aliphatic polyamide (nylon) or polyethylene terephthalate (PET) type are resistant to potential attack during the fitting and removal of the tire and resistant to fatigue. In addition, they have a very broad range of elastic deformation allowing easy adjustment of the design parameters, manufacturing parameters and usage parameters. They are also inexpensive. A reinforcer of aromatic polyamide (aramid) type offers the advantage of generating the circumferential and radial stiffness required using a smaller number of cords. This property is attractive for tire designs in which the space available for laying the additional circumferential reinforcing element is small in volume. Hybrid reinforcers containing aliphatic polyamides and aromatic polyamides are an attractive compromise because of the many design options they offer.

Textile materials having a thermal contraction property are even more attractive because they generate an additional force of clamping onto the rim because of the reduction in diameter they undergo as a result of the curing of the tire, which force will oppose the unseating forces without having an impact on the ease of mounting of the tire. The diameter of laying of the additional circumferential reinforcing element at the time of manufacture will be calculated according to its thermosensitivity properties.

What is meant by a textile additional circumferential reinforcing element is any element made up of textile threads, individual or laid in bundles or strips, discontinuous or continuous substantially in a circumferential direction and the technical result of which is to increase the circumferential and radial stiffnesses of the bead portion axially on the inside of the axially innermost point of the main circumferential reinforcing element, radially on the outside of a radially innermost part of the bead reinforcement and radially on the inside of the radially outermost point of the main circumferential reinforcing element.

Alternatively, it might also be possible to use elastic metal threads which are wavy or discontinuous in order to perform the additional circumferential reinforcing element function. Note that in a solution using discontinuous metal threads there is a risk of the bead cracking around the ends of the metal threads.

Regarding the metal reinforcers, a metal reinforcer is mechanically characterized by a curve representing the tensile force (in N), applied to the metal reinforcer, as a function of the relative elongation (in %) of the metal reinforcer, referred to as the force-elongation curve. This force-elongation curve is used to deduce the tensile mechanical properties, such as the structural elongation As (in %), the total elongation at break At (in %), the force at break Fm (maximum load in N) and the strength at break Rm (in MPa), these properties being measured in accordance with standard ISO 6892, 1984.

The total elongation at break At of the metal reinforcer is, by definition, the sum of the structural, elastic and plastic elongations thereof (At=As+Ae+Ap). The structural elongation As is the result of the relative positioning of the metal threads of which the metal reinforcer is made at a low tensile force. The elastic elongation Ae is the result of the very elasticity of the metal of the metal threads of which the metal reinforcer is made, considered individually (Hooke's law). The plastic elongation Ap is the result of the plasticity (irreversible deformation beyond the elastic limit) of the metal of these metal threads considered individually. These various elongations and the respective meanings thereof, all of which are well known to those skilled in the art, are described, for example, in documents U.S. Pat. No. 5,843,583, WO2005014925 and WO2007090603.

An extension elastic modulus (in GPa) is also defined, at any point on the force-elongation curve, which represents the gradient of the straight-line tangential to the force-elongation curve at this point. In particular, the extension elastic modulus of the elastic linear part of the force—elongation curve is referred to as the tensile elastic modulus or Young's modulus.

An elastic metal reinforcer is characterized by a structural elongation As at least equal to 1% and a total elongation at break At at least equal to 4%. Furthermore, an elastic metal reinforcer has a tensile elastic modulus usually of between 40 GPa and 150 GPa.

An inelastic or non-eleastic metal reinforcer is characterized by a relative elongation, under a tensile force equal to 10% of the force at break Fm, at most equal to 0.2%. Furthermore, an inelastic metal reinforcer generally has a tensile elastic modulus usually of between 150 GPa and 230 GPa.

What is meant by wavy metal threads is metal threads that have been preformed plastically and exhibit radial or circumferential waviness, or hybrid waviness about their mean positions. This waviness gives the thread an elastic behaviour to the additional circumferential reinforcing element thus formed in the tire.

It is particularly advantageous for the bead filler portion of the bead, at least radially on the inside of the radially innermost point of the main circumferential reinforcing element, to have an elastic modulus at 10% elongation at least equal to 15 MPa. This is because the stiffness of the bead filler material also plays a part in the stiffness of the zone and in the unseating phenomenon.

For preference, the bead filler portion radially on the outside of the radially outermost point of the main circumferential reinforcing element has an elastic modulus at 10% elongation less than 0.5 times the elastic modulus at 10% elongation of the bead filler portion at least radially on the inside of the radially innermost point of the main circumferential reinforcing element so as to encourage bending on the sidewall with respect to the bead and thus limit the dissipation of energy.

With this same objective of limiting the dissipation of energy during running and to facilitate manufacture, it may be preferable for the bead filler portion axially on the outside of the radially outermost point of the main circumferential reinforcing element to have an elastic modulus at 10% elongation less than 0.5 times the elastic modulus at 10% elongation of the bead filler portion at least radially on the inside of the radially innermost point of the main circumferential reinforcing element.

The mounted assembly comprising at least a wheel and a tire according to the invention operates even better if it comprises a wheel possessing at least one hump the height of which is greater than or equal to 1 mm. The hump makes it possible to block axial movement of the bead toe in the event of lateral load and prevents any slippage of the point of contact between the bead toe and the rim thus forcing the bead to move around this. The hump is a term known to those skilled in the art and denotes a "bump" on the bead seating surface of a wheel rim. Rims for passenger vehicle tires are very often equipped with a hump.

BRIEF DESCRIPTION OF THE DRAWINGS

The features and other advantages of the invention will be better understood with the aid of FIGS. 1 to 12, the said figures not being drawn to scale but in simplified form, in order to make the invention easier to understand:

FIG. 9 notably illustrates the distances Y and Z and the axial width of the bead at the seat D.

DETAILED DESCRIPTION OF THE DRAWINGS

Figure 1:
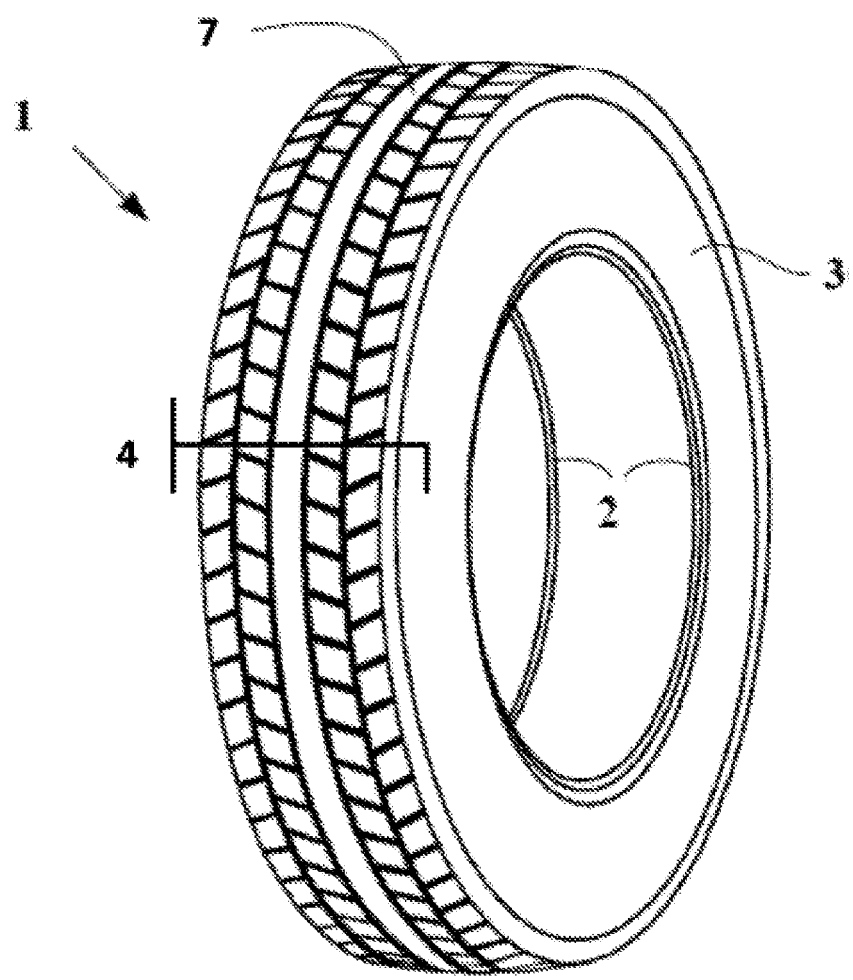
FIG. 1 depicts a tire according to the prior art.

FIG. 1 schematically depicts a tire 1 according to the prior art. The tire 1 comprises a crown 4 comprising a crown reinforcement (not visible in the figure) surmounted by a tread 7, two sidewalls 3 extending the crown radially inwards, and two beads 2 radially on the inside of the sidewalls 3.

Figure 2:
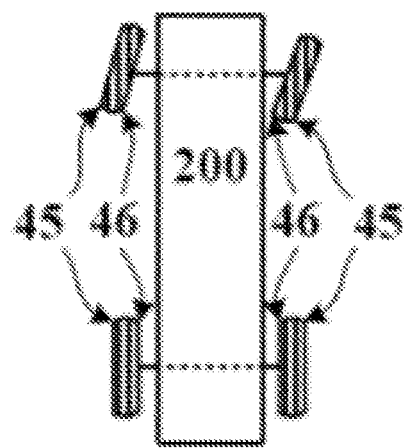
FIG. 2 illustrates the terms "inboard edge" and "outboard edge" of a tread.

FIG. 2 schematically depicts tires intended to be mounted on mounting rims of wheels of a vehicle 200 and having a set direction of mounting on the vehicle. It comprises an outboard axial edge 45 and an inboard axial edge 46, the inboard axial edge 46 being the edge intended to be mounted on the side of the body shell of the vehicle when the tire is mounted on the vehicle according to the said predetermined direction of mounting and the reverse in the case of the outboard axial edge 45. In the document the "outboard side" refers to the outboard axial edge 45.

Figure 5:
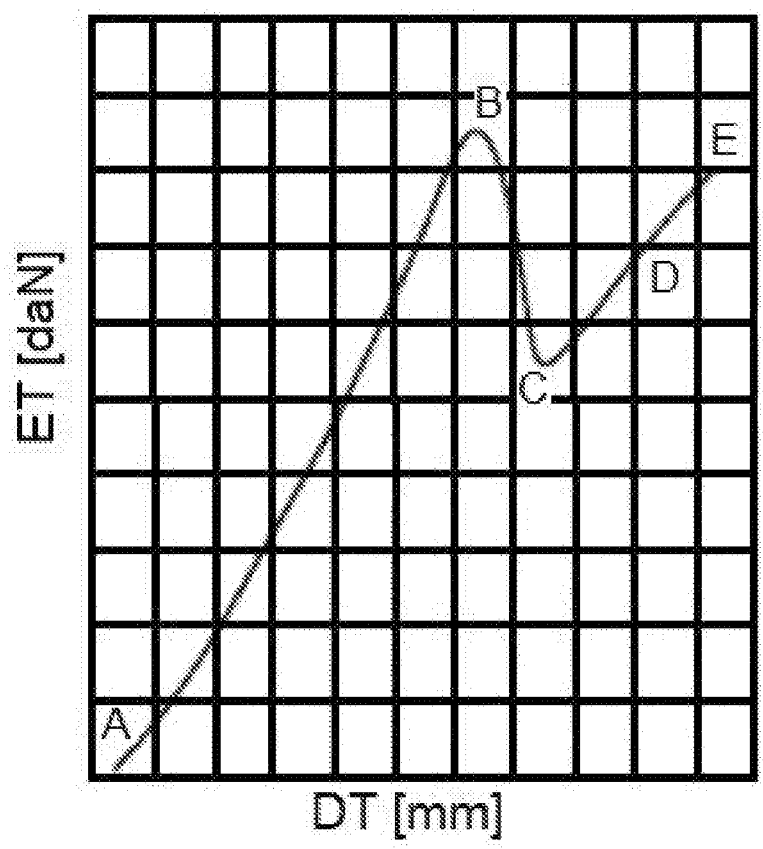

The graph depicted in FIG. 5 shows the result of a numerical simulation of an unseating test in accordance with Chinese standard GB/T 4502-2009. A conical form is applied against the sidewall of the tire. This conical form advances at a set rate. The load ET required to make the conical form advance at this rate is plotted as a function of the movement DT of the conical form.

Figure 3:
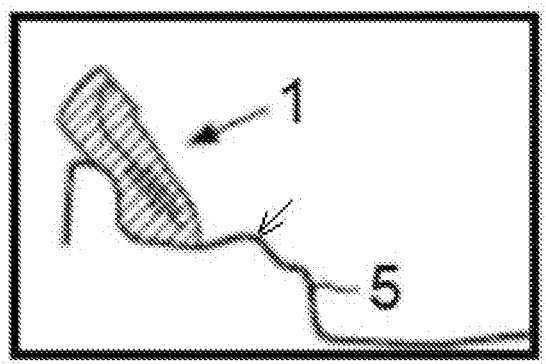
FIGS. 3 to 8 depict the movement of the sidewall of a tire as a function of the load applied to the tire sidewall during an unseating test.

The initial situation of the tire 1 (only the bead and part of the sidewall of which have been depicted) on its mounting rim 5 is depicted in FIG. 3, which corresponds to A on the graph depicted in FIG. 5.

Figure 4:
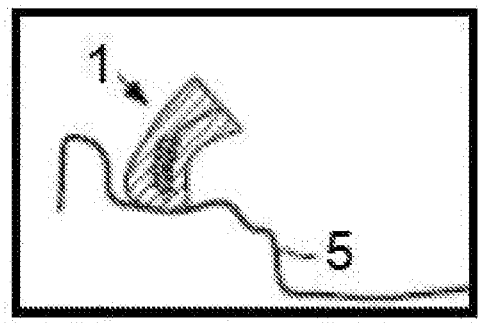
Figure 6:
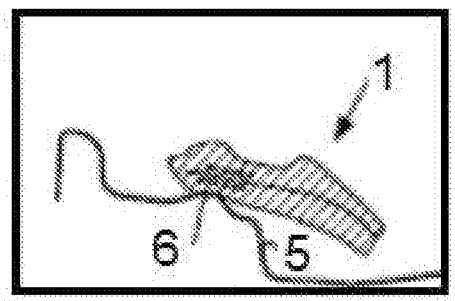
Figure 7:
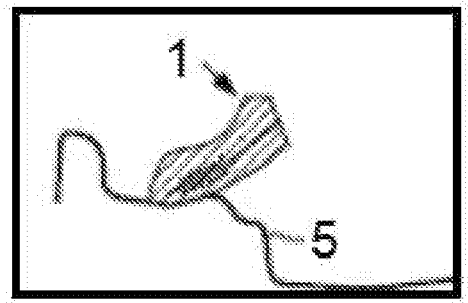
Figure 8:
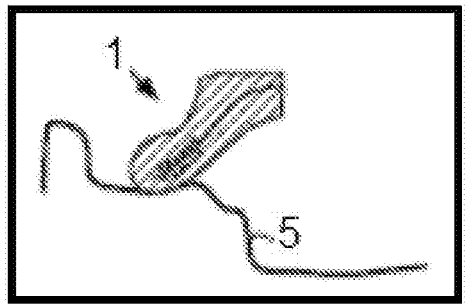

As the conical form moves, the resistance of the tire is manifested in the near-linear increase in the load ET. The bead begins to move up to the point at which it begins to tilt. This is the situation depicted in FIG. 4, which corresponds to B on the graph depicted in FIG. 5. This tilting causes a drop in the load required to cause the conical form to advance, until the bead has completely tilted, as is depicted in FIG. 8, which corresponds to C on the graph depicted in FIG. 5. The load then increases again because now the bead has to be made to rise over the hump 6 of the mounting rim 5, as illustrated in FIG. 7, which corresponds to D on the graph depicted in FIG. 5. It is only when the bead has overcome the hump 6 (situation depicted in FIG. 6, which corresponds to point E on the graph depicted in FIG. 5) that unseating is complete.

Figure 9:
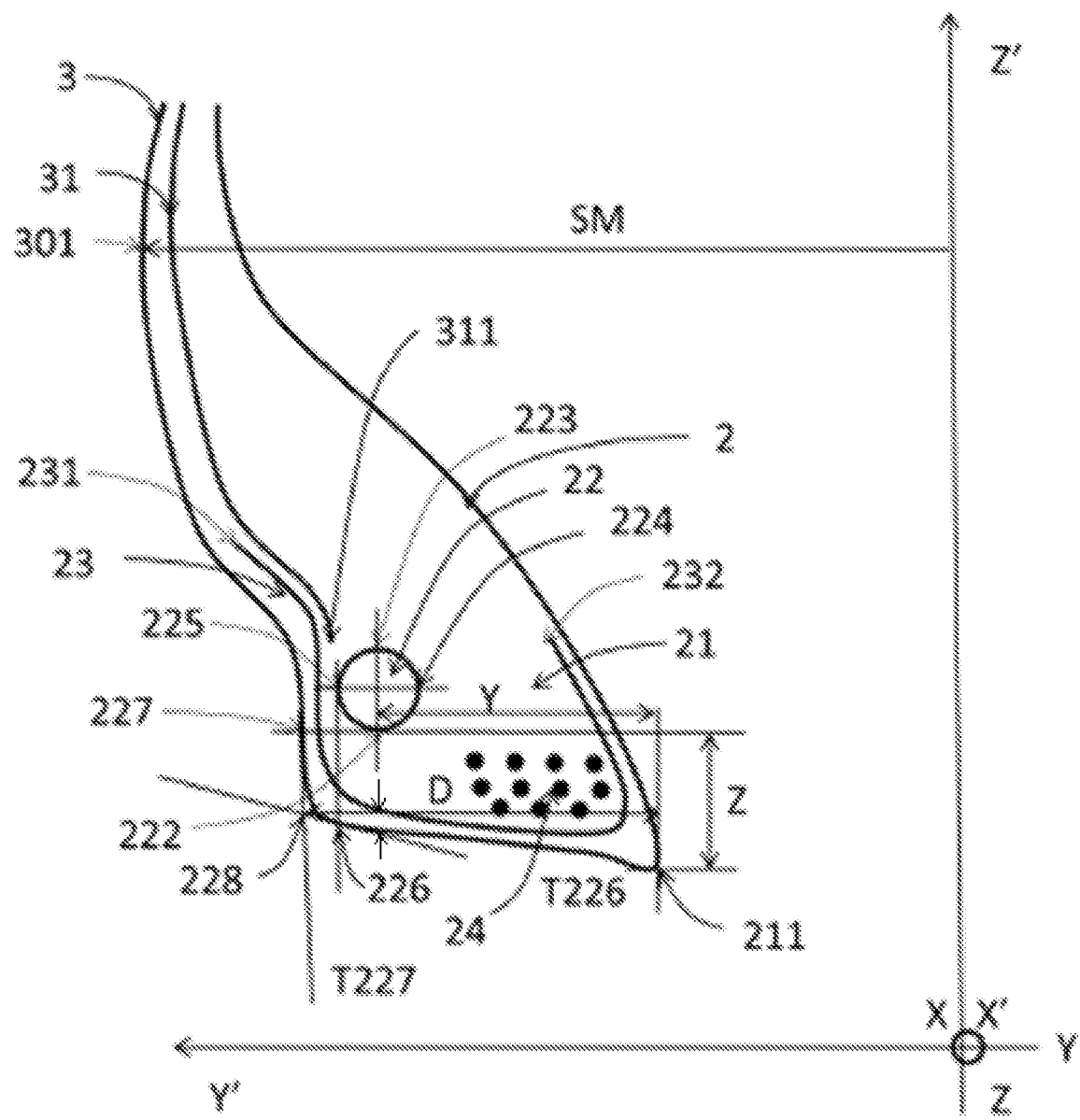
FIG. 9 depicts a meridian section through the bead and sidewall according to an embodiment of the invention.

FIG. 9 schematically depicts the meridian cross section of a bead 2 and of part of the sidewall 3 according to the invention. The tire 1 comprises two beads 2 intended to come into contact with a mounting rim (not depicted). At least the bead 2 and the sidewall 3 positioned on the outboard side (cf. FIG. 2) comprise:
- a main circumferential reinforcing element 22 of which the radially innermost point 222 is placed a radial distance Z away from the radially innermost point 211 of the tire and an axial distance Y away from this same point,
- a carcass reinforcement comprising at least one carcass layer 31 of which the end 311 is situated, for this version of the invention, radially on the outside of the radially outermost point 223 of the main circumferential reinforcing element 22 and radially on the inside of the point 301 of greatest width of the tire. The end 311 of the carcass layer is also axially on the outside of the axially innermost point 224 of the main circumferential reinforcing element,
- a bead reinforcement comprising at least one bead layer 23 of which the axially outermost end 231 is radially on the outside of the end 311 of the carcass layer 31 and of which the axially innermost end 232 is radially on the outside of the radially innermost point 222 of the main circumferential reinforcing element,
- an additional circumferential reinforcing element 24 made up of several circumferentially wound threads of which at least one thread is axially on the inside of the axially innermost point 224 of the main circumferential reinforcing element 22, radially on the outside of a radially innermost part of the bead reinforcement and radially on the inside of the radially outermost point 223 of the main circumferential reinforcing element 22,
- the axially outermost point 225 of the main circumferential reinforcing element 22 and its interior radial projection 226 onto the external face of the tire and the tangent T226 to the external face of the tire at this point 226 or seat of the bead,
- the radially innermost point 222 of the main circumferential reinforcing element 22 and its external axial projection 227 onto the external face of the tire and the tangent T227 to the external face of the tire at this point 227 or side of the bead,
- the intersection of these 2 tangents T226 and T227 at the point 228, the point at which the seat and the side of the bead meet,
- the axial width of the bead at the seat D, equal to the axial distance between the radially innermost point 211 and the point 228 at which the seat and the side of the bead meet.

The bead 2 depicted in FIG. 9 further comprises a portion intended to come into contact with the mounting rim (not depicted).

Figure 10:
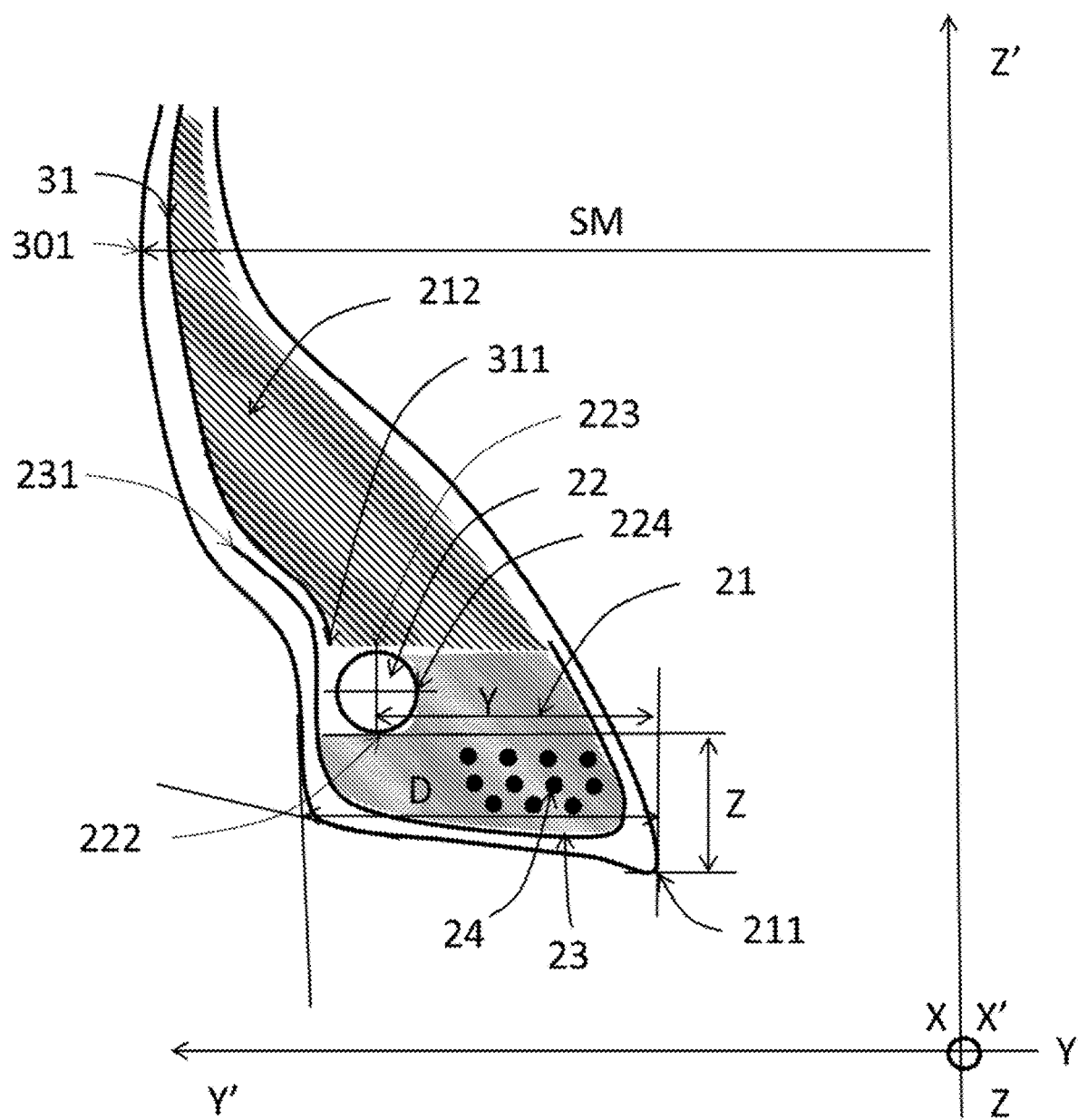
FIGS. 10 and 11 depict a meridian section of the bead and of the sidewall according to an embodiment of the invention, and preferred distributions of different bead filler rubbers.
Figure 11:
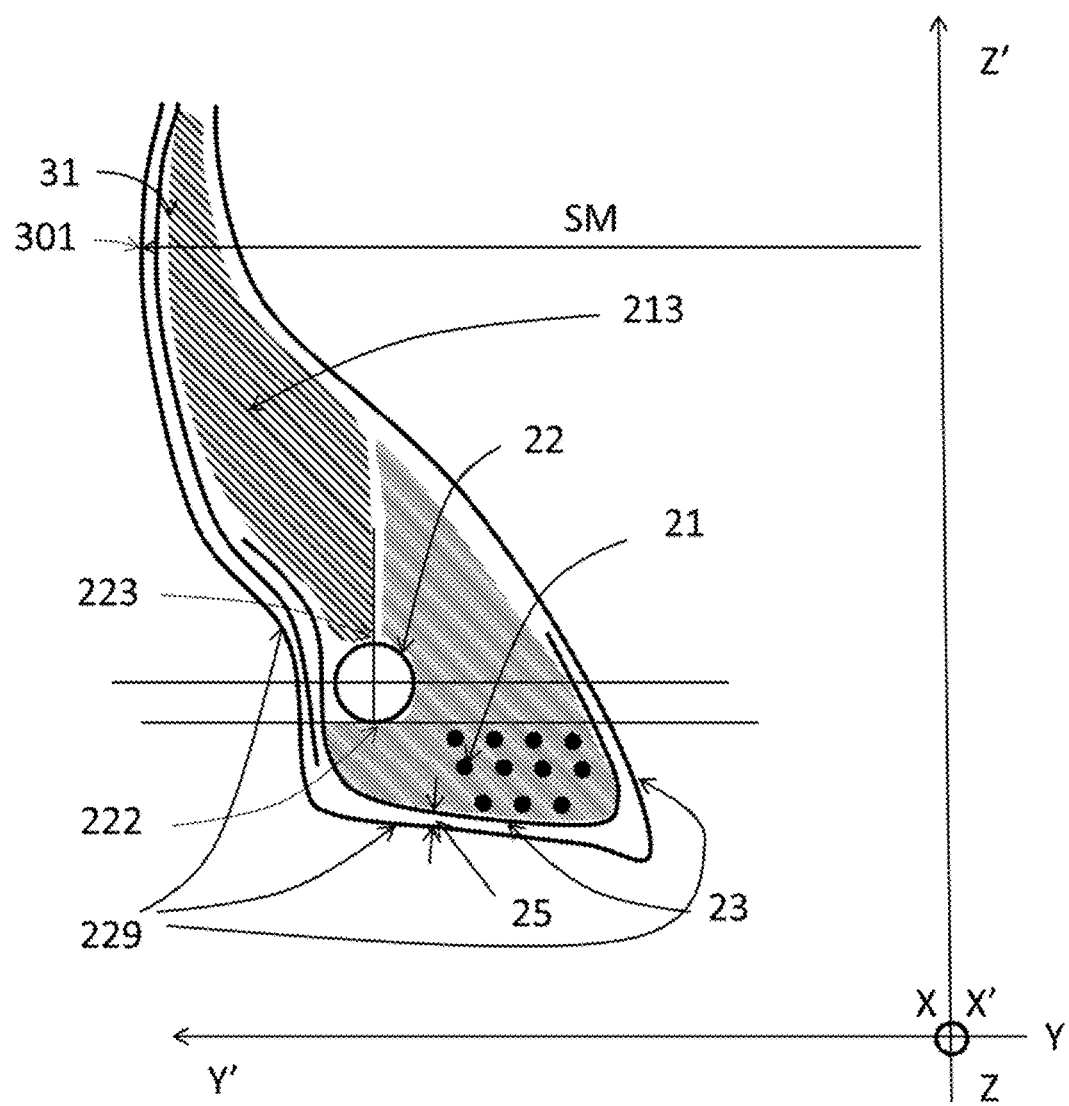

FIGS. 10 and 11 illustrate the various preferred configurations of the portions of bead filler. In FIGS. 10 and 11, the bead filler portion 21 is at least radially on the inside of the radially innermost point 222 of the main circumferential reinforcing element 22. In FIG. 10, the bead filler portion 212 is radially on the outside of the radially outermost point 223 of the main circumferential reinforcing element. In FIG. 11, the bead filler portion 213 is axially on the outside of the radially outermost point 223 of the main circumferential reinforcing element 22. FIG. 11 also illustrates the possibility of the bead layer 23 being axially on the outside of the carcass layer 31 in the region of the zone of overlap, and at the end 311 of the carcass layer being radially on the inside of the radially innermost point 222 of the main circumferential reinforcing element 22. FIG. 11 also shows a few points 229 belonging to the external face of the bead. This figure also shows an example of a point 26 of the bead reinforcement, which points are positioned radially on the inside of the radially innermost point 222 of the main circumferential reinforcing element 22, positioned, with respect to the external face of the bead, at a maximum distance 25 at most equal to Z/2, half the radial distance Z between the radially innermost point of the bead 211 and the radially innermost point of the main circumferential reinforcing element 222.

Figure 12:
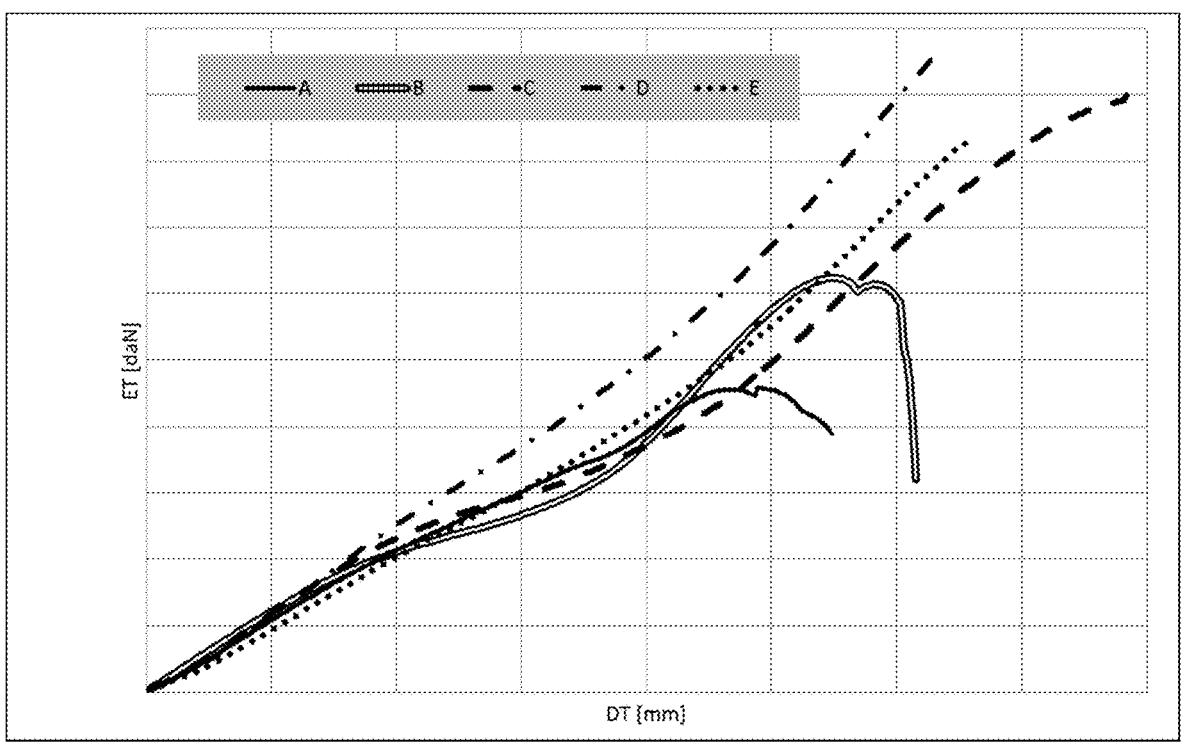
FIG. 12 depicts the movements of the sidewall of a tire as a function of the load applied to the sidewall during an unseating test.

FIG. 12 depicts the force ET, expressed in daN, required to cause the conical form of the unseating test in accordance with Chinese standard GB/T 4502-2009 to advance as a function of the displacement DT of the conical form, expressed in mm. The test results:
- of a tire A according to the prior art, inflated to a pressure of 0.7 bar, indicated by a continuous line;
- of a tire B, according to the invention, but without an additional circumferential reinforcing element, inflated to a pressure of 0.7 bar, indicated by a double continuous line;
- of a tire C according to the invention, comprising additional circumferential reinforcing elements made of polyethylene terephthalate (PET), inflated to a pressure of 0.7 bar, indicated by a discontinuous line;
- of a tire D according to the invention, comprising hybrid additional circumferential reinforcing elements made of aromatic polyamide (aramid) and of aliphatic polyamide (nylon), inflated to a pressure of 0.7 bar, indicated by a chain line made up of alternating dashes and dots;

of a tire E according to the invention comprising hybrid additional circumferential reinforcing elements made of aromatic polyamide (aramid) and of aliphatic polyamide (nylon), inflated to a pressure of 0 bar, indicated by a dotted line;

are depicted.

The improvement afforded by an embodiment of the invention for causing unseating, is measured in terms of force between the maximum on the ordinate axis of the curve corresponding to the tire according to the prior art and the maximum on the curve corresponding to an embodiment of the invention considered. The improvement afforded is measured in terms of the displacement between the abscissa values for these two maxima.

The inventors carried out the invention for a tire of size 335/30_ZR_18, having a carcass reinforcement made up of two carcass layers of polyester making an angle of +/−85° with the circumferential direction, a bead layer made of aramid making an angle of 55° with the circumferential direction, a main circumferential reinforcing element made up of braided metal cords with a cross section of 17 mm², the elastic modulus at 10% elongation of the bead filler 21 is equal to 54 MPa and that of the bead filler 213 to 23 MPa. The positioning of the main circumferential reinforcing element is such that Y=10 mm, Z=6.7 mm, D=17.7 mm, Y/D=0.56, Z/D=0.38. The length of overlap between the carcass layer and the bead layer varies from 20 to 25 mm; the radial position of the end 311 of the radially innermost carcass layer is equal to the radial position of the radially outermost point 223 of the main circumferential reinforcing element 22, the mean thickness of the protective rubber of the bead toe is 1.5 mm. The inventors carried out two alternative forms of the invention, using this geometry to which they added an additional circumferential reinforcing element made up of:

either 40 turns of a reinforcer consisting of two strands of polyethylene terephthalate with a thread count of 140 dTex, laid in such a way that the diameter of the radially innermost turn of the reinforcer of the tire mounted on the rim was at least 4% greater than its laying diameter during manufacture, the purpose of this being to create an additional clamping force clamping the tire on to the rim, or 40 turns of a hybrid reinforcer consisting of two strands of aromatic polyamide (aramid) with a thread count of 167 dTex, and of one strand of aliphatic polyamide (nylon) with a thread count of 140 dTex laid in such a way that the diameter of the radially innermost turn of the reinforcer of the tire mounted on the rim was at least 2% greater than its laying diameter during manufacture, the purpose of this being to create an additional clamping force clamping the tire on to the rim.

These solutions are compared against a tire according to the prior art, of size 335/30_ZR_18, having a carcass reinforcement made up of two polyester carcass layers making an angle of +/−85° with the circumferential direction, a circumferential reinforcing element of braided metal cords of cross section 17 mm2, a bead filler the elastic modulus of which is equal to 23 MPa, and a bead toe of which the elastic modulus at 10% elongation is equal to 23 MPa; the positioning of the main circumferential reinforcing element being such that Y=7 mm, Z=8 mm, D16 mm, Y/D=0.43, Z/D=0.5.

In order to measure the impact that the presence of the additional circumferential reinforcing element has, the inventors created a tire according to the invention but without the additional circumferential reinforcing element. In this manufacture, the positioning of the main circumferential reinforcing element is such that Y=7.8 mm, Z=4.5 mm, D14.6 mm, Y/D=0.53, Z/D=0.31.

The test method is similar to the one recommended in Chinese standard GB/T 4502-2009. The test is carried out under a pressure of 0.7 bar. The wheel used is a wheel in accordance with the ETRTO standard, with a hump measuring 1.5 mm in height.

The tire, depicted by curve B in FIG. 12, according to the invention but without the presence of an additional circumferential reinforcing element allows an 18% improvement on the displacement and a 19% improvement on the unseating force needed for a tire according to the prior art, represented by curve A in FIG. 12, when the pressure needed to overcome the hump of the rim during fitting is reduced by 50%, thus demonstrating that the ease of fitting is not only maintained but also improved.

The two productions of tire according to the invention, represented by curves C and D in FIG. 12, do not unseat at the limits of the test machine used, and this represents an at least 50% improvement on the displacement and an at least 100% improvement on the force as compared with a tire of the prior art (curve A in FIG. 12) when the pressure needed to overcome the rim hump during fitting is reduced by 30 to 20%, thus demonstrating that the ease of fitting is not only maintained but also improved.

The tire according to the invention, comprising an additional circumferential reinforcing element made up of 40 hybrid threads containing an aromatic polyamide (aramid) and an aliphatic polyamide (nylon) was also tested at a pressure of 0 bar (curve E depicted by dotted line in FIG. 12). The test went to the limit of displacement of the machine without the tire unseating from the wheel. This last test demonstrates the unseating improvements afforded by the invention not only at low pressure but also for a tire at zero pressure.

The invention claimed is:

1. A tire to be mounted on a mounting rim, comprising:
   two beads, which are capable of coming into contact with the mounting rim, each bead comprising an axially outer side and a radially inner seat;
   each bead in meridian cross-section having a radially innermost point, an axial width at seat D, and an external face comprised of the surface of the tire in contact with the outside of the tire and belonging to the bead, and each bead comprising a bead filler comprised of at least one rubber composition, a circumferential reinforcing element referred to as the main circumferential reinforcing element;
   the meridian cross-section of the main circumferential reinforcing element having a radially innermost point, a radially outermost point and an axially innermost point, the radially innermost point being positioned at a radial distance Z and at an axial distance Y from the radially innermost point of the bead;
   the axial width at the seat D being measured between the radially innermost point of the bead and the point of intersection between a first straight line tangential to the external axial projection of the radially innermost point of the main circumferential reinforcing element and a second straight line tangential to the internal radial projection of the axially outermost point of the main circumferential reinforcing element;

a carcass reinforcement connecting the two beads and comprising a carcass layer extending in each bead radially towards the inside as far as a carcass layer end;

for at least one said bead, the carcass layer end is radially on the inside of the point of greatest axial width (SM) of the tire and axially on the outside of the axially innermost point of the main circumferential reinforcing element, wherein, for each of the at least one said bead, the ratio Y/D between the axial distance Y from the radially innermost point of the main circumferential reinforcing element to the radially innermost point of the bead, and the axial width of the bead at the seat D, is greater than or equal to 0.5, wherein, for each of the at least one said bead, the ratio Z/D between the radial distance Z from the radially innermost point of the main circumferential reinforcing element to the radially innermost point of the bead, and the axial width of the bead at the seat D, is less than or equal to 0.4, wherein, each of the at least one said bead comprises a bead reinforcement, comprised of a bead layer, which surrounds the bead filler in such a way that the axially outermost end of the bead layer is radially on the outside of the radially innermost end of the carcass layer and such that the axially innermost end of the bead layer is radially on the outside of the radially innermost point of the main circumferential reinforcing element, wherein, for each of the at least one said bead, the bead reinforcement is close to but not contacting the external surface of the bead such that the points on the bead reinforcement which are positioned radially on the inside of the radially innermost point of the main circumferential reinforcing element are positioned, with respect to the closest portion of the external surface of the bead, at a maximum distance, measured perpendicular to the external surface of the bead, that is less than or equal to Z/2, half the radial distance Z between the radially innermost point of the bead and the radially innermost point of the main circumferential reinforcing element, and wherein, each of the at least one said bead comprises an additional circumferential reinforcing element, axially on the inside of the axially innermost point of the main circumferential reinforcing element, radially on the outside of a radially innermost part of the bead reinforcement and radially on the inside of the radially outermost point of the main circumferential reinforcing element.

2. The tire according to claim 1, wherein, for each of the at least one said bead, the ratio Y/D between the axial distance Y from the radially innermost point of the main circumferential reinforcing element to the radially innermost point of the bead, and the axial width of the bead at the seat D is less than or equal to 0.75.

3. The tire according to claim 1, wherein, for each of the at least one said bead, the ratio Z/D between the radial distance Z from the radially innermost point of the main circumferential reinforcing element to the radially innermost point of the bead, and the axial width of the bead at the seat D is greater than or equal to 0.25.

4. The tire according to claim 1, wherein, for each of the at least one said bead, the axially outermost end of the bead layer is radially on the outside of the radially innermost end of the carcass layer by a difference in radius greater than or equal to 10 mm.

5. The tire according to claim 1, wherein, for each of the at least one said bead, the end of the carcass layer that is radially innermost is radially on the outside of the radially outermost point of the main circumferential reinforcing element.

6. The tire according to claim 1, wherein, for each of the at least one said bead, the axially outermost end of the bead layer is axially on the outside of the radially innermost end of the carcass layer.

7. The tire according to claim 1, wherein, for each of the at least one said bead, the axially outermost end of the bead layer is axially on the inside of the radially innermost end of the carcass layer.

8. The tire according to claim 1, wherein, for each of the at least one said bead, the bead layer is a layer of reinforcing elements adjacent ones of the bead layer reinforcing elements either being parallel to one another or forming between them angle of less than or equal to 5°, and the reinforcing elements of a the bead layer are made of textile.

9. The tire according to claim 8, wherein the textile is one of an aliphatic polyamide, an aromatic polyamide, a combination of aliphatic polyamide and of aromatic polyamide, a polyethylene terephthalate, and a rayon.

10. The tire according to claim 1, wherein the carcass layer is a layer of reinforcing elements and the reinforcing elements of the carcass layer are comprised of metal or of textile.

11. The tire according to claim 10, wherein the textile is one of an aliphatic polyamide, an aromatic polyamide, a combination of aliphatic polyamide and of aromatic polyamide, a polyethylene terephthalate, and a rayon.

12. The tire according to claim 1, wherein the carcass layer is a layer of reinforcing elements and the reinforcing elements of a the carcass layer are parallel to one another or form between them an angle of less than or equal to 5°, the reinforcing elements of the carcass layer making with the circumferential direction an angle of between 65° and 115°.

13. The tire according to claim 1, wherein, for each of the at least one said bead, the bead layer is a layer of reinforcing elements, adjacent ones of the bead layer reinforcing elements either being parallel to one another or forming between them an angle of less than or equal to 5° the reinforcing elements of a the bead layer making with the circumferential direction an angle of between 20° and 160°.

14. The tire according to claim 1, wherein, for each of the at least one said bead, the additional circumferential reinforcing element comprises at least one textile material.

15. The tire according to claim 14, wherein, the at least one textile material is one of an aliphatic polyamide, an aromatic polyamide, a polyester, and a rayon.

16. The tire according to claim 1, wherein, for each of the at least one said bead, the bead filler portion abuts a second bead filler portion made up of a second rubber composition and positioned radially on the outside of the radially outermost point of the main circumferential reinforcing element and the bead filler portion has an elastic modulus at 10% elongation E21 greater than or equal to 15 MPa.

17. The tire according to claim 1, wherein, for each of the at least one said bead, the bead filler portion abuts a second bead filler portion made up of a second rubber composition and positioned radially on the outside of the radially outermost point of the main circumferential reinforcing element and the second bead filler portion radially on the outside of the radially outermost point of the main circumferential reinforcing element has an elastic modulus at 10% elongation E212 less than 0.5 times the elastic modulus at 10% elongation E21 of the bead filler portion at least partially radially on the inside of the radially innermost point of the main circumferential reinforcing element.

18. The tire according to claim 1, wherein, for each of the at least one said bead, the bead filler portion abuts a second bead filler portion made up of a second rubber composition and positioned axially on the outside of the radially outermost point of the main circumferential reinforcing element and the second bead filler portion axially on the outside of the radially outermost point of the main circumferential reinforcing element has an elastic modulus at 10% elongation E213 less than 0.5 times the elastic modulus at 10% elongation E21 of the bead filler portion at least partially radially on the inside of the radially innermost point of the main circumferential reinforcing element.

19. The tire according to claim 1, wherein, for each of the at least one said bead, the axially outermost end of the bead layer is radially on the outside of the radially innermost end of the carcass layer by a difference in radius greater than or equal to 20 mm.

20. An assembly comprising a tire according to claim 1, mounted on a wheel possessing, for each of the at least one said bead a hump the height of which is greater than or equal to 1 mm.

* * * * *